US007169282B2

(12) United States Patent
Talary et al.

(10) Patent No.: US 7,169,282 B2
(45) Date of Patent: Jan. 30, 2007

(54) DIELECTROPHORESIS APPARATUS

(75) Inventors: Mark Stuart Talary, London (GB); Ronald Pethig, Anglesey (GB); Richard Stanley Lee, Gwynedd (GB)

(73) Assignee: Aura BioSystems Inc., Taipei (TW)

( * ) Notice: Subject to any disclaimer, the term of this patent is extended or adjusted under 35 U.S.C. 154(b) by 654 days.

(21) Appl. No.: 10/437,414

(22) Filed: May 13, 2003

(65) Prior Publication Data

US 2004/0226819 A1 Nov. 18, 2004

(51) Int. Cl.
*G01N 27/453* (2006.01)

(52) U.S. Cl. ...................... 204/670; 204/643; 204/660; 204/648; 204/671

(58) Field of Classification Search ................ 210/456, 210/455, 497.1, 494.1, 493.4; 204/643, 547, 204/742, 660, 648–650, 553–554, 670, 671, 204/642

See application file for complete search history.

(56) References Cited

U.S. PATENT DOCUMENTS

| | | | | |
|---|---|---|---|---|
| 4,390,403 | A | 6/1983 | Batchelder | |
| 4,441,972 | A * | 4/1984 | Pohl | 435/450 |
| 4,588,503 | A * | 5/1986 | Sugiura | 210/232 |
| 4,956,065 | A | 9/1990 | Kaler et al. | |
| 5,344,535 | A | 9/1994 | Betts et al. | |
| 5,454,472 | A | 10/1995 | Benecke et al. | |
| 5,569,367 | A | 10/1996 | Betts et al. | |
| 5,626,734 | A | 5/1997 | Docoslis et al. | |
| 5,795,457 | A | 8/1998 | Pethig et al. | |
| 5,814,200 | A * | 9/1998 | Pethig et al. | 204/547 |
| 6,149,789 | A | 11/2000 | Benecke et al. | |
| 6,197,176 | B1 | 3/2001 | Pethig et al. | |
| 6,264,815 | B1 | 7/2001 | Pethig et al. | |
| 6,287,832 | B1 * | 9/2001 | Becker et al. | 435/173.9 |
| 6,310,309 | B1 * | 10/2001 | Ager et al. | 209/127.1 |
| 6,467,630 | B1 | 10/2002 | Zborowski et al. | |
| 6,641,708 | B1 | 11/2003 | Becker et al. | 204/547 |
| 6,790,330 | B2 | 9/2004 | Gascoyne et al. | 204/547 |
| 6,858,439 | B1 * | 2/2005 | Xu et al. | 436/518 |
| 6,900,021 | B1 * | 5/2005 | Harrison et al. | 435/7.21 |
| 6,942,776 | B2 * | 9/2005 | Medoro | 204/547 |
| 2002/0125138 | A1 | 9/2002 | Medoro | |

FOREIGN PATENT DOCUMENTS

WO WO 01/83113 A1 11/2001

OTHER PUBLICATIONS

Huang, Ying et al. "Dielectrophororetic Cell Separation and Gene Expression Profiling on Microelectronic Chip Arrays." *Analytical Chemistry,* 74:14, pp. 3362-3371, Jul. 15, 2002.

Wang, Zujing et al. "Membrane dielectric changes indicate induced apoptosis in HL-60 cells more sensitively than surface phosphatidylserine expression or DNA franmentation." *Biochimica et Biophysica Acta,* 1564, pp. 412-420, 2002.

* cited by examiner

*Primary Examiner*—Alex Noguerola
(74) *Attorney, Agent, or Firm*—Fish & Richardson, P.C.

(57) ABSTRACT

Devices for filtering fluids using dielectrophoresis are disclosed.

37 Claims, 8 Drawing Sheets

DIELECTROPHORESIS APPARATUS

BACKGROUND

This invention relates to dielectrophoresis.

Dielectrophoresis ("DEP") refers to the force experienced by particles suspended in a fluid medium when exposed to an applied electric field gradient. Due to the applied electric field gradient, differences in dielectric polarization between the particles and the fluid medium cause the particles to experience the dielectrophoretic force. This effect can be quantified in terms of the electromagnetic momentum balance via the Maxwell stress tensor, or in terms of the magnitude and distribution of the charges induced on and within the particle by the applied field. Particles, such as blood cells, experiencing strong DEP motion will typically experience a DEP force of about $10^{-11}$ N, which is about 40 times greater than a gravitational settling force and about $2\times10^5$ times larger than a maximum Brownian diffusion force.

A particle's structural and physico-chemical properties can contribute towards its DEP response. This response can also depend on the frequency of the applied electric field. Due to these dependencies, variations in applied field frequencies and external environmental conditions can simultaneously probe different particle substructures and processes. For example, some fundamental electrical properties of cells, such as membrane capacitance, membrane resistance and cytoplasmic conductance, affect their DEP response. These properties also reflect a cell's ability to maintain ion balances and are a measure of metabolic work and biological organization. Thus, DEP can provide a non-invasive method for determining the electrical properties of cell populations, down to the single cell level.

SUMMARY

Because DEP effectively maps structural and physico-chemical properties into a translational force whose direction and magnitude reflects particle properties, some degree of separation occurs between particles of different characteristics. Accordingly, DEP can be used to separate mixtures of particles. DEP particle separation exploits dielectrophoretic forces that are experienced by particles when a non-uniform electric field interacts with the field-induced electrical polarization of the particles. Depending on the dielectric properties of the particles relative to the suspending medium (e.g., liquid), these forces can be either positive or negative and can direct particles toward strong or weak electric field regions, where particles with distinct dielectric properties can be collected. Under the same conditions, particles with different dielectric properties can experience a different (e.g., reduced or opposite) force. Thus, for a particular set of conditions, the motion of one type of particle can be dominated by a DEP force (e.g., an attractive or repulsive DEP force), while the motion of another type of particle is not (e.g., where particle motion can be dominated by the fluid flow or gravity). Under such circumstances, DEP can be used to separate a mixture of the two particle types.

In certain aspects, the invention features a DEP filter that includes a coiled substrate having two or more electrode arrays disposed on a substrate surface. During operation, the filter applies a DEP force to particles in a fluid flowing between separated layers of the coiled substrate. The layer spacing and electrode geometry can be designed to provide optimal fluid flow through the filter and optimal filtration efficiency. By providing opposing electrode arrays on the same surface of the substrate, the applied electric field can be substantially independent of layer spacing. Thus, in some embodiments, narrowly spaced electrodes (e.g., on the order of microns) may be used in conjunction with relatively widely spaced coiled layers (e.g., on the order of hundreds of microns). Furthermore, having independent electrode and layer spacing can provide further flexibility in filter design. For example, separation between coil layers can vary across the filter while the spacing between electrodes in opposing electrode arrays remains constant.

In certain aspects, the invention also features DEP filters including a coiled electrode substrate designed for optimal fluid flow between the coil layers. Spiral substrate guides can secure the ends of the coiled substrate, maintaining the layer separation without the need for additional spacers in the active area of the filter (e.g., adjacent the electrodes). Furthermore, a manifold having inlet channels registered with the interlayer spacings can feed fluid directly into the spacings. Additionally, filters can include outlet channels in an outlet manifold also registered with the interlayer spacings. The filter can thus provide a substantially unimpeded path in the active region of the filter, enabling a uniform fluidic flow profile through these regions.

Filter construction can allow filters to guide and trap particles with the same electrodes by superimposing a number of summed electric field frequencies. This may offer advantages in the ease of construction and fabrication of the filtration apparatus by minimizing the number of components and complexity of the electrode structures required on the flexible substrates.

A description of various aspects of the invention follows.

In general, in a first aspect, the invention features an apparatus, including a chamber, a substrate disposed in the chamber, wherein the substrate is coiled around an axis and adjacent layers of the coiled substrate are separated from each other. The apparatus also includes a pair of electrode arrays disposed on a surface of the substrate, wherein a potential difference may be maintained between the electrode arrays, and an inlet manifold positioned at a first end of the coiled substrate, wherein the inlet manifold includes a plurality of inlet channels adjacent to spaces between the separated layers.

Embodiments of the apparatus may include one or more of the following features and/or features of other aspects.

The pair of electrode arrays can include interdigitated electrodes. A size of each of the inlet channels can be the same as other inlet channels.

In general, in another aspect, the invention features an apparatus including a substrate coiled around an axis and first and second electrodes disposed on a first surface of the substrate, wherein the apparatus is capable of maintaining a potential difference between the first and second electrodes.

Embodiments of the apparatus may include one or more of the following features and/or features of other aspects.

The apparatus can further include an inlet manifold through which fluid can be supplied to the coiled substrate. The apparatus can also include an outlet manifold through which fluid can be removed from the coiled substrate. The first electrode can be an electrode in a first electrode array and the second electrode can be an electrode in a second electrode array, and the first and second electrode arrays are disposed on the first surface. The first and second electrode arrays can include interdigitated electrodes. The coiled substrate can include a plurality of adjacent substrate layers separated by at least 5 microns (e.g., by at least about 10 microns, 20 microns, 30 microns, 50 microns, 100 microns, 200 microns). The adjacent substrate layers can be separated by a distance different from (e.g., greater than) a minimum separation of electrodes in the first and second electrodes. In some embodiments, the adjacent substrate layers are separated by a distance that varies depending on a distance of the layers from the axis. The adjacent substrate layers can be separated by at least 100 microns. The inlet and outlet manifolds can be located at different positions along the axis.

The apparatus can include a chamber housing the coiled substrate and/or a first substrate guide that includes a spiral channel into which a first end of the coiled substrate is slotted. The apparatus can also include a second substrate guide that includes a spiral channel into which a second end of the coiled substrate is slotted, wherein the first end is opposite the second end. The substrate can he a polymer substrate. In some embodiments, the apparatus can include one or more additional electrodes disposed on a second surface of the substrate, the second surface being opposite the first surface.

The inlet manifold can include a plurality of inlet channels and/or the outlet manifold can include a plurality of outlet channels. The substrate can include a plurality of perforations.

The electrodes can include an electrode material and the apparatus can further include a layer of a first material disposed on the first electrode, wherein the first material is different from the electrode material. The first material can be an electrically insulating material. The apparatus can also include an additional electrode disposed on the surface of the layer. The layer can reduce a chemical reaction between the electrode material and a particle proximate to the coiled substrate. Adhesion between a target particle and the first material can be different to (e.g., less than) the adhesion between the target particle and the electrode material. In some embodiments, the apparatus can include a layer of a second material disposed on the second electrode, wherein the second material is different from the first material. Adhesion between a cell and the first material can be different from adhesion between the cell and the second material.

In another aspect, the invention features a system for filtering fluid comprising the apparatus of one of the foregoing aspects and a supply reservoir, wherein the supply reservoir is configured to supply fluid to the apparatus. The system can include a buffer reservoir configured to supply fluid to the apparatus and/or a pre-filter configured to filter fluid from the reservoir prior to the fluid being supplied to the apparatus. The pre-filter can substantially prevent certain particles in the fluid from entering the apparatus. The certain particles can be larger than a threshold particle size (e.g., the threshold particle size can have a maximum dimension substantially equal to a minimum separation of adjacent layers of the coiled substrate). In some embodiments, the system can include a transducer configured to introduce a density variation in the fluid prior to the fluid entering the apparatus. The density variation can be sufficient to separate particles in the fluid from each other prior to the particles entering the apparatus.

In general, in another aspect, the invention features a system for filtering a fluid, including a supply reservoir, a pair of electrode arrays disposed on a surface of a coiled substrate, wherein the coiled substrate comprises a plurality of adjacent layers that are separated from each other, a collection reservoir, and a signal generator electrically coupled to the pair of electrode arrays. During operation of the system, the supply reservoir supplies the fluid to spaces between separated adjacent layers of the coiled substrate and the collection reservoir collects fluid exiting from the spaces, and the signal generator applies a potential difference between the pair of electrode arrays.

Embodiments of the system may include one or more of the following features and/or features of other aspects.

The system can include a chamber housing the coiled substrate and a pump which during operation applies a pressure to fluid in the chamber. The pressure can be a negative pressure or a positive pressure.

In general, in another aspect, the invention features a method for filtering a fluid. The method includes introducing fluid into spaces between adjacent layers of a coiled substrate, applying a potential difference between first and second electrodes disposed on a surface of the coiled substrate, and removing fluid from between the adjacent layers, wherein a concentration of target particles in the removed fluid is different than a concentration of particles in the fluid prior to being introduced.

Embodiments of the method may include one or more of the following features and/or features of other aspects.

The method can include applying a pressure to the fluid between the adjacent layers to cause the fluid to flow. The pressure can be a positive pressure or a negative pressure. The fluid flow can be opposite to a gravitational force. Applying the voltage can cause target particles in the spaces to experience a dielectrophoretic force (e.g., a positive or negative dielectrophoretic force). The target particles can experience a traveling wave dielectrophoretic force.

The method can include adjusting a parameter of the fluid as a function of time, the parameter being selected from the group consisting of conductivity, permittivity, buoyancy, viscocity, pH, osmolarity and temperature. The concentration of target particles in the removed fluid can be different to (e.g., less than) the concentration of target particles in the fluid prior to being introduced. The target particles can be biological particles, and the method can include introducing a compound to the fluid and determining the biological particle's response to the compound based on the removed fluid. The method can include formulating a pharmaceutical composition comprising the compound, and administering the pharmaceutical composition to a cell culture or an animal.

The method can include varying a frequency of the potential difference while introducing the fluid and/or purging target particles from spaces between adjacent layers of the coiled substrate after applying the potential difference. A concentration of other particles different from the target particles in the removed fluid can be substantially the same as a concentration of the other particles in the fluid prior to being introduced.

In addition to the advantages described above, embodiments of the invention may include one or more of the following advantages. Embodiments can provide DEP filters having high electrode-surface-area-to-chamber-volume ratio thereby enabling efficient filtration of fluids.

The DEP filters can be manufactured inexpensively, using commercially available materials and established manufacturing techniques. DEP filters can be mechanically robust.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION Of DRAWINGS

FIG. 8A shows four filters connected in series. FIG. 8B shows four filters connected in parallel.

Like reference symbols in the various drawings indicate like elements.

DETAILED DESCRIPTION

Figure 1:
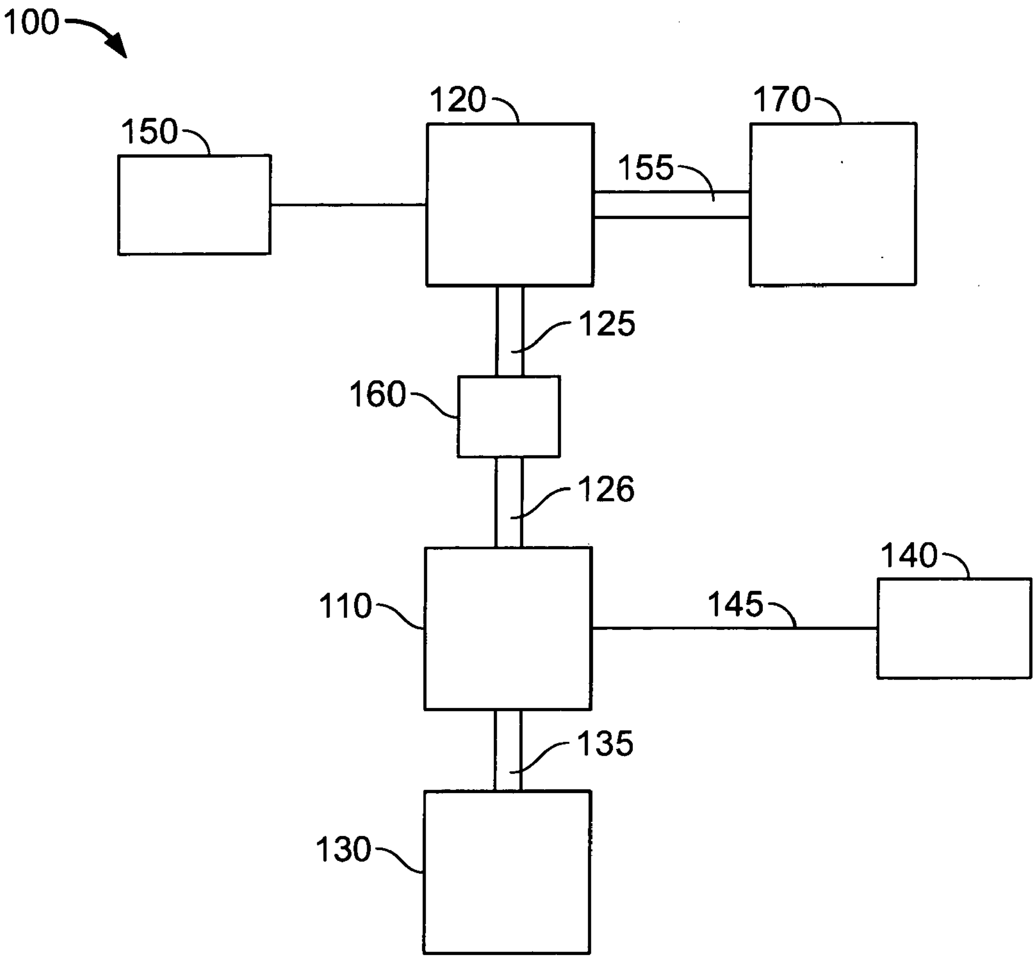
FIG. 1 is a schematic diagram of a dielectrophoresis ("DEP") filtration system.

Referring to FIG. 1, a dielectrophoresis ("DEP") filtration system 100 includes a filter 110, a supply reservoir 120, a buffer reservoir 170, a collection reservoir 130, and a pre-filter 160. Supply reservoir 120 is connected to pre-filter by a supply tube 125. Pre-filter 160 and collection reservoir 130 are connected to filter 110 by a supply tube 126 and an outlet tube 135, respectively. A buffer reservoir 170 is connected to the supply reservoir 120 by a supply tube 155. A signal generator 140 is connected to filter 110 by a cable 145. DEP filtration system 100 also includes a pump 150, which is connected to supply reservoir 120.

During operation, pump 150 pumps fluid from supply reservoir 120 to filter 110 through supply tube 125, pre-filter 160, and supply tube 126. One or more types of particle are suspended in the fluid. Filter 110 separates one or more of the particle types from the fluid, and filtered fluid exits filter 110 through tube 135 and collects in reservoir 130.

In order to separate particles from the fluid, signal generator 140 applies a voltage across opposing electrode arrays disposed on a surface of a substrate in filter 110. The electrodes and substrate are described below. The applied voltage generates an electric field between energized electrodes. Depending on the dielectric properties of the particles and the fluid, the electric field can cause particles to be attracted to or repelled from the electrodes.

In general, the amplitude and frequency of the applied voltage depends on the electrode geometry and type of target particle and fluid being filtered. In some embodiments, power supply 140 can apply a DC voltage to the electrodes. More typically, however, an AC voltage is applied. The AC waveform can be sinusoidal, saw-tooth, triangular, square, or some other complex waveform. In some embodiments, the waveform can be a superposition of multiple sinusoidally-varying waveforms (e.g., a waveform having components at frequencies ω, 2ω, 3ω, . . . ). The frequency of the AC waveform is usually selected to provide a desired DEP response in a target particle. In most embodiments, the frequency is in the range of Hz (e.g., about 10 Hz, 100 Hz, 1,000 Hz) to MHz or greater (e.g., about 0.1 MHz, 1 MHz, 100 MHz, or more). In cases where the waveform is non-sinusoidal, the frequency refers to the number of times the waveform repeats itself per unit time.

Pre-filter 160 prevents undesirably large particles from entering filter 110. In some embodiments, pre-filter 160 includes a porous membrane that passes particles less than a certain threshold size. For example, the threshold size can be the maximum anticipated size of the target particle, and pre-filter 160 can remove larger, non-target particles from the fluid prior to filtering. In some embodiments, the threshold particle size of pre-filter 160 can be based on the physical characteristics of filter 110, such as the maximum particle size that can be passed through filter 110. Parameters goverhing these characteristics of filter 110 are discussed in detail below. Although pre-filter 160 in system 100 is shown as a separate unit, in other embodiments the pre-filter can be included in as a component within filter 110. Alternatively, pre-filtering can be performed in a system separate from system 100, or not at all. Examples of filters include silicon and ceramic filters with pore sizes designed to exclude undesirable particles. Silicon and ceramic filters may be advantageous because cross-flow across the surface of the filter can be used to remove the undesirable particles, pore sizes may be uniform and/or high pore densities can be achieved (providing the possibility of high flow rates). This can prevent the pre-filter from becoming blocked or clogged.

In some cases, particles in the fluid can become clumped together to form an agglomerate of particles too large to pass through filter 110. In such cases, system 100 can include one or more additional components to break up agglomerates of particles prior to or during their passage through filter 110. For example, system 110 can include a transducer which introduces a density variation (e.g., a periodic density variation, such as an ultrasonic pulse) in the fluid, causing agglomerations to break up. Such a transducer can be included as a separate component in the path from supply reservoir 120 to filter 110, or as a component of the filter, pre-filter, or supply reservoir. Examples include scaleable piezoelectric devices to sonicate the sample at frequencies that range from 0.1 Hz to 100 kHz at a force amplitude that breaks up particle agglomerations, preferably without causing excessive mechanical stress which could lead to particle disintegration or cell lysis in embodiments where the particles are cells. Alternatively, or additionally, other methods to disperse agglomerations can be used, such as applying localized turbulence in the sample by applying a disruptive mechanical force to break up particle agglomerations.

Although FIG. 1 depicts supply reservoir 120 being positioned higher than filter 110 and collection reservoir 130, in preferred embodiments the system components are positioned so that the fluid is pumped upwards, against the force of gravity. This can reduce sedimentation of particles in the system.

Pump 150 can be any pump that provides appropriate pressure to the fluid so that it flows through the filter at an appropriate rate. An appropriate rate is one at which fluid flow through the filter is laminar (i.e., ideally turbulence in the filter should be avoided), but still sufficiently fast to filter fluid volumes in a reasonable time. Suitable types of pump include a peristaltic pump, a diaphragm pump, or pumps that can be operated at low speeds and low shear rates. A manually operated pump (e.g., a syringe or hand pump) can also be used. In some embodiments, fluid can be flowed through the filter under the force of gravity and no pump is necessary. In preferred embodiments, however, the fluid is pumped upward through the filter to reduce bubbles in the filter and to act as a balancing force against gravitational sedimentation forces In the present embodiment, filter 110 has a volume of about 50 milliliters and system 100 can filter fluid at a rate of about 1 milliliter per minute. However, in other embodiments, system 100 can be adapted to filter smaller volumes (e.g., about 10 milliliters, one milliliter, 100 microliters, or 10 microliters or smaller) or larger volumes (e.g., about 100 milliliters, 500 milliliters, one liter or more). Furthermore, the filtration rate can vary as desired. In some embodiments, the rate is less than about 1 milliliter per minute (e.g., about 500 microliters per minute, 100 microliters per minute, 10 microliters per minute, or less). Alternatively, the rate can be higher than about one milliliter per minute (e.g., about five milliliters per minute, 10 milliliters per minute, 50 milliliters per minute, 100 milliliters per minute or higher).

Although in system 100 pump 150 applies a positive pressure to move fluid through filter 110, in other embodiments the pump 150 can be configured to draw fluid from supply reservoir 120 to filter 110 by applying a negative pressure. To apply a negative pressure, pump 150 can be connected to collection reservoir 130 or outlet tube 135. In this configuration, the pump reduces the fluid pressure on the outlet side of filter 110 relative to the inlet side, thereby drawing fluid from supply reservoir 120 into and through filter 110. One advantage of pumping the fluid using a negative pressure is that the system can be less likely to leak fluid, e.g., through corrupt seals, because pressure in the filter is lower than ambient pressure.

Figure 2A:
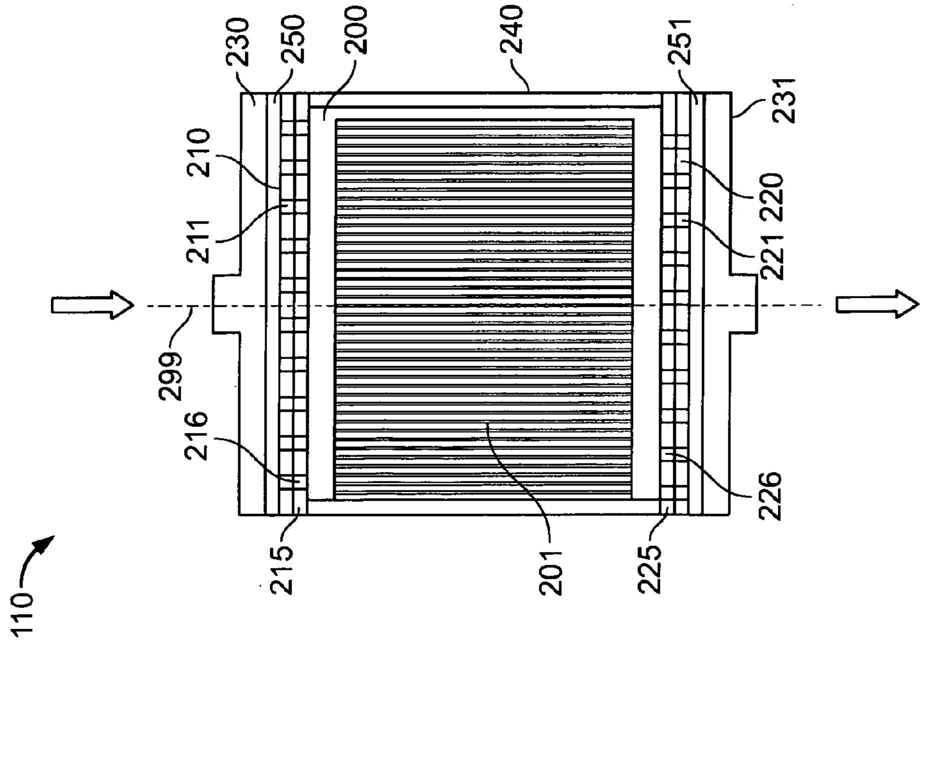
FIG. 2A is a schematic diagram of a DEP filter.
Figure 2B:
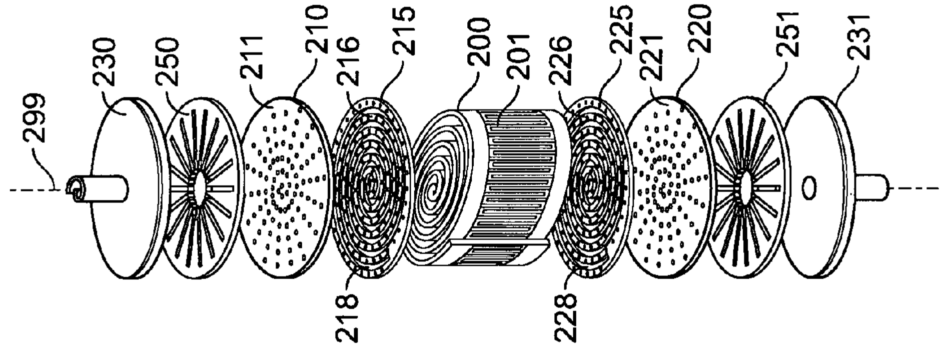
FIG. 2B is an exploded perspective view of components of the DEP filter shown in FIG. 2A.

Referring to FIG. 2A and FIG. 2B, the dielectrophoretically active component of filter 110 is an electrode element, which includes a substrate 200 coiled around an axis 299. A pair of electrode arrays 201 are disposed on a surface of substrate 200. Substrate 200 is supported by substrate guides 215 and 225 by slotting into spiral channels 218 and 228, which maintain a separation distance between layers of coiled substrate 200. Substrate 200 is housed in a chamber 240. Chamber 240 is a hollow cylindrical tube, coaxially oriented with substrate 200. Fluidic flow through chamber 240 is controlled by an inlet manifold 210 at one end, and by outlet manifold 220 at the other end. The chamber is filled via a fluidic inlet connector 230, which distributes the sample fluid to inlet ports 211 via fluidic inlet channels 250. The filtered sample leaves the chamber via an outlet connector 231 having combined samples from outlet ports 221 via fluidic outlet channels 251.

Inlet manifold 210 includes a number of inlet ports 211, which are in fluid communication with inlet tube 125 (shown in FIG. 1). Inlet ports 211 are sufficiently large to pass particles suspended in the fluid. Substrate guide 215 also includes a number of inlet ports 216, which are registered with inlet ports 211 and with the spaces between adjacent layers of coiled substrate 200. Accordingly, during operation, fluid pumped through inlet tube 125 passes through inlet ports 211 and 216 into the spaces between adjacent layers of coiled substrate 200.

Similarly, outlet manifold 220 and substrate guide 225 also include a number of registered outlet ports, indicated by numerals 221 and 226, respectively. Fluid exits chamber 240 through these outlet ports, and flows into outlet tube 135 (in FIG. 1). The fluid flow direction is indicated by arrows in FIG. 2A.

During operation, fluid pumped from the supply reservoir enters chamber 240 through inlet ports 211 and 216. The fluid flows parallel to coil axis 299 and penetrates the spaces between the layers of coiled substrate 200. During the pumping, the signal generator energizes electrodes 201, generating an electric field adjacent the electrodes in the space between the substrate surfaces. Depending on the dielectric properties of the fluid and the particles suspended in the fluid, the electric field can cause the particles to experience a DEP force. In preferred embodiments, the applied electric field causes the electrodes to attract a target particle type. The target particles remain next to the electrodes, while non-target particles (if also present in the fluid) continue to flow through the chamber with the fluid. Accordingly, target particles are removed from the fluid exiting the chamber.

In some embodiments, an attractive dielectrophoretic force balances the rate of flow of non-target particles through the chamber. Balancing these forces can increase the amount of time particles spend in the chamber without reducing fluid velocity, which can further improve the purity and recovery of the separation process. Other means of improving separation efficiency can be combined in the separation procedure by altering physical and/or chemical properties of the fluid and/or particles to alter the magnitude of the dielectrophoretic force. Examples of properties that can be altered include the sample conductivity, permittivity, osmolarity, temperature and/or pH.

Once non-target particles have been removed from the fluid, target particles can be purged from the chamber by adjusting the applied electric field so that the electrodes no longer attract them. Depending on the interaction between the target particles and the electrode material and/or substrate material, the applied voltage to the electrodes can either be reduced (or switched off) or the frequency varied to change the nature of the DEP force. For example, in situations where the surface interaction between the particles and the electrodes causes the particles to stick to the electrodes, it may be necessary to remove the particles by applying a negative DEP force. However, where the interaction is weak, the viscous force from flowing fluid and/or gravity may be sufficient to remove the target particles from the electrodes.

System 100 can be used to increase the concentration of a target particle in a fluid volume. Where the chamber volume is smaller than the volume to be filtered, the concentration of target particles in the chamber increases as more of them are filtered from the fluid. Ultimately, after releasing the trapped particles from the electrodes, the volume of fluid flushed from the chamber has a higher concentration of the target particles than the initial sample.

In the present embodiment, the size of inlet ports 211 and 216 and outlet ports 221 and 226 are the same size and shape. In general, however, the size and shape of inlet and/or outlet ports may vary as desired. Moreover, the combination of fluidic channels and/or inlet and/or outlet ports can be engineered to provide the desired fluidic flow through the device. For example, in some embodiments, it may be desirable to maintain the same flow rate over the electrodes throughout the filter. Equal flow may be achieved by making the size of each channel and/or the size of each port equal. In alternative embodiments, differential flow rates can be achieved by varying the port size and/or channel size. One example of this would be to have smaller ports close to the coil axis and larger ports further from the axis. This can result in differential flow rates of the sample through different portions of the filter. In this example, the sample fluid would flow more rapidly through portions further from the coil axis where ports are larger.

In some embodiments, continuous separation can be achieved by incorporating a number of outlet paths from outlet port 231. Such an outlet port system can allow for continuous sampling from a variety of the differing flow profiles simultaneously and enable the recirculation of some outlets to improve sample purity and recovery of desired target particles. For example, fluid extracted from a region of the filter where the flow velocity is relative high can be directed to a first collection reservoir, whereas, fluid extracted from a region of the filter where the flow velocity is slower can be directed to a second collection reservoir. Analyzing the fluid content from the different flow velocity regions of the filter can be used to empirically determine an optimal flow rate for a particular target particle from the sample.

Without wishing to be bound by theory, it is instructive to outline a theoretical model used to parameterize the dielectrophoretic force. For a spherical particle of radius r, suspended in a medium of absolute permittivity $\epsilon_m$, the DEP force is given theoretically by $$F_{DEP}=2\pi r^3\epsilon_m\alpha(\nabla E^2), \quad (1)$$

where α is a parameter defining the effective polarizability of the particle with respect to the suspending medium (the real part of the Clausius-Mossotti factor), and the factor ($\nabla E^2$) quantifies the gradient and strength of the electric field, E, acting on the particle. The polarizability parameter reflects the effective capacitance and conductivity of the particle, and can theoretically have a value that ranges between +1.0 and −0.5. A positive value of a means that the applied electric field will induce a dipole moment in the particle aligned with the applied field, which will cause a positive DEP force. A negative a results in an induced dipole moment aligned opposite to the applied field, which causes the particle to experience a negative DEP force.

Equation (1) indicates that the. DEP force is proportional to the volume of the particle, and because the electric field, E, appears as a squared term, the sense of this force is independent of the polarity of the field, so that AC as well as DC voltages applied to the electrodes can cause a DEP force. However, the polarizability function, α, of many particles can be dependant on the AC frequency. Accordingly, DEP filtration systems can operate at frequencies at which the DEP response of one type of particle differs from other types of particle. Where different types of particle are suspended in the fluid, a differential response can be used to move the different types of particle to different regions of the chamber, facilitating their separation.

For a fixed magnitude of the applied voltage signal, the factor ($\nabla E^2$) in Equation (1) is determined primarily by the geometry of the electrodes (e.g., electrode shape and/or spacing between electrodes). Apart from a few idealized cases, a quantitative determination of this factor is usually performed using computer-aided numerical methods. For many electrode geometries, this factor decays as a function of the particle's distance from the electrodes (e.g., decays exponentially or near-exponentially). Thus, the DEP force experienced by the particle also decays as a function of the particle's distance from the electrode. To effectively manipulate particles using an electric field, the DEP force experienced by the particles should be greater than other forces experienced by the particle (e.g., gravitational force or force due to Brownian motion). Accordingly, an effective electrode element should constrain a maximal volume of fluid sufficiently close to the electrodes for the DEP force to manipulate the particles in the fluid.

Figure 3:
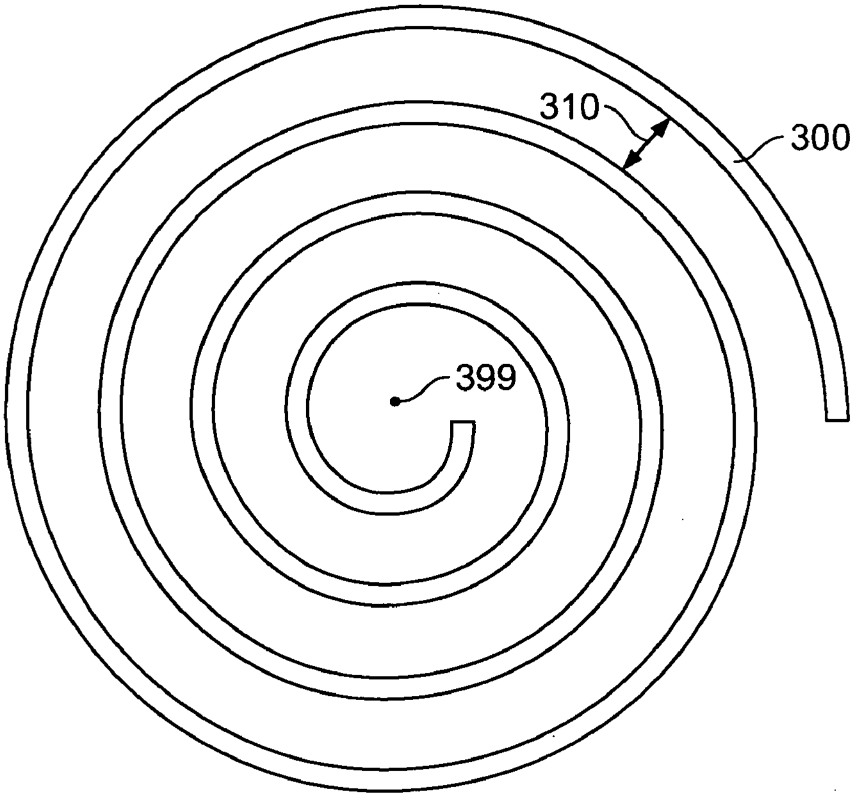
FIG. 3 is a top view of a coiled substrate.

The distance between adjacent layers of the coiled substrate affects the proximity of particles in the filter to the electrodes. Referring to FIG. 3, the layers of a coiled substrate 300 are separated by a distance 310. Substrate 300 is coiled around an axis 399. In addition to affecting the proximity of particles to the electrodes, factors influencing the choice of separation distance 310 during filter design include the type of particles to be filtered and type of fluid medium. Substrate separation should be large enough to accommodate the size of the particles (i.e., substrate separation should be larger than the diameter of the largest particles to be passed with filtered fluid). Additionally, separation distance 310 should be sufficiently large to allow the fluid medium to flow through the chamber under the force of the pump without turbulent flow arising. The thickness and mechanical properties of the substrate and electrode materials can also influence a designer's selection of the separation distance. Substrate 300 should not be coiled so tightly as to cause mechanical failure of the electrodes. In some embodiments, substrate separation 310 can be on the order of microns (e.g., between about two and 20 microns). More typically, substrate separation is on the order of tens to hundreds of microns (e.g., about 50 microns, 100 microns, 200 microns, 300 microns, 500 microns). In some embodiments, substrate separation can be on the order of millimeters or larger (e.g., more than about 1 millimeter, 2 millimeters, 5 millimeters, 10 millimeters). In many biological applications, substrate separation 310 is between 100 microns and 1 millimeter (e.g., between about 300 microns and 500 microns).

The separation between adjacent layers can be constant or can vary. For example, layers further from the coil axis can be closer together than layers nearer the axis. Other modulations in layer spacing are contemplated (e.g., periodic variations, or other monotonic variations as a function of radial distance from the coil axis).

The space between adjacent layers of the coiled substrate can be substantially free of any objects that might impede fluid flow (e.g., spacer elements).

For each filter, electrode geometry and layer separation can be optimized for the filter's particular end-use application. By providing opposing electrode arrays on one surface of the substrate, electrode spacing and layer separation may be different. In contrast, where opposing electrodes are disposed on opposite substrate surfaces, electrode spacing is the same as the layer spacing. In preferred embodiments, the electrodes are spaced more narrowly than the separation distance. For example, the electrode spacing may be less than about 0.5 times the layer separation (e.g., less than about 0.2 times the layer separation, such as 0.1 or less). As used herein, electrode spacing refers to a minimum separation between electrodes in opposing electrode arrays.

Figure 4A:
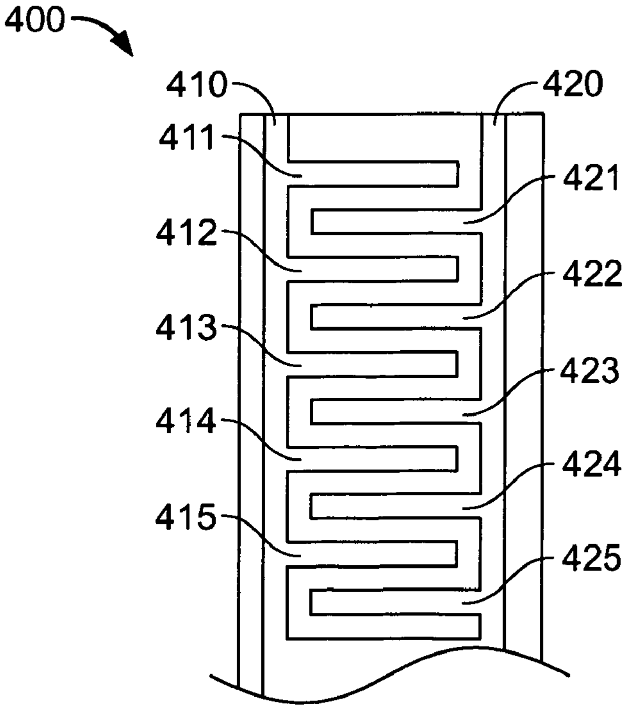
FIG. 4A shows a schematic diagram of a DEP electrode.

In some embodiments, the opposing electrode arrays include interdigitated electrodes. Referring to FIG. 4A, a portion 400 of the electrode array 201 includes 10 parallel interdigitated electrodes. Electrodes 411, 412, 413, 414, and 415 are in electrical contact with a first bus line 410, while electrodes 421, 422, 423, 424, and 425 are in electrical contact with bus line 420. During operation, the signal generator applies an AC voltage between bus line 410 and bus line 420. Accordingly, the potential difference between electrodes 411–415 and 421–425 gives rise to an electric field between the electrodes.

The dimensions of the interdigitated electrodes can vary as desired. In some embodiments, the electrodes are about five or more microns wide (e.g., about 10 microns, 20 microns, 50 microns, 100 microns) and about 20 or more microns long (e.g., 30 microns, 40 microns, 50 microns, 75 microns, 100 microns, 200 microns, 500 microns). Furthermore, the separation between adjacent electrodes can vary. In some embodiments, the separation between adjacent electrodes is greater than the electrode's width. The separation can be, for example, more than about 10 microns (e.g., about 20 microns, 30 microns, 50 microns, 100 microns, 200 microns, or more).

Although portion 400 shows only 10 interdigitated electrodes, electrode array 201 may have fewer or more interdigitated electrodes (e.g., more than 50 electrodes, 100 electrodes, 250 electrodes or more).

Figure 4B:
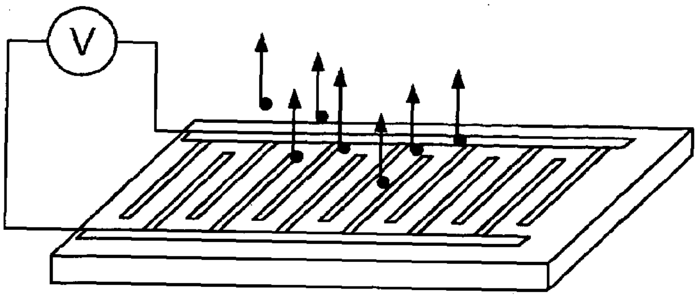
FIGS. 4B and 4C are perspective views of interdigitated electrodes energized so that a particle adjacent the electrodes experiences a negative and a positive DEP force, respectively.
Figure 4C:
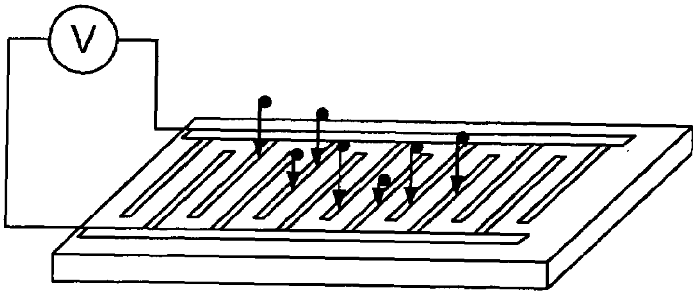

Referring to FIG. 4B, particles are repelled from the interdigitated electrodes under the influence of a negative DEP force. This occurs where the electrical polarizability of the suspending medium at a particular frequency of the AC waveform exceeds that of the particles. The case where particles are attracted to the interdigitated electrodes under the influence of a positive DEP force is shown in FIG. 4C. This situation occurs where the polarizability of the particle exceeds that of the suspending medium.

Other electrode geometries can also be used. In general, electrode geometry is selected to provide a desired electric field profile. Examples of other electrode geometries include polynomial electrodes, castellated electrodes, arrays of posts or stub electrodes, interdigitated zig-zag electrodes or curved electrodes whose periodic pattern may be fixed, or varying in pitch and/or amplitude.

In general, the substrate can be made from any material that can be coiled, is compatible with the electrode material, and does not adversely interact with the components of the sample to be filtered. In preferred embodiments, the substrate is formed from a flexible material that can be rolled into a coil after the electrode array has been formed. Use of a flexible substrate material allows planar processing techniques to be used to form an electrode array (e.g., various established deposition and patterning techniques used in printed circuit board manufacturing, micro electro-mechanical system (MEMS) manufacturing and the semiconductor and flat panel display industries). The substrate can be polymeric, such as including polyimide, polyethylene, polypropylene, polyester, polystyrene, poly methylmethacrylate or polyacrylamide.

In some embodiments, the substrate is perforated at one or more locations. During operation, perforations can equalize fluid pressure between different layers of the coil, which can reduce the probability of adjacent layers collapsing onto each other due to pressure differentials. Perforations may be large enough to permit the passage of target and/or non-target particles in the sample.

Electrode arrays can be formed on the substrate using lithographic techniques. For example, the electrode array can be etched from a monolithic layer of the electrode material (e.g., chromium, gold, palladium, or vanadium) coated on the surface of the substrate. The substrate can include an adhesion layer to promote adhesion of the coated conductor to the substrate. Chrome is an example of an adhesion layer for gold electrodes. Alternatively, the electrode array can be printed onto the substrate, or transferred onto the substrate, e.g., using a transfer adhesive.

In some embodiments, one or more additional layers can be provided on top of the electrodes and/or substrate surface. Surface coatings on the electrode surfaces and substrates can be used to improve compatibility of the filtration device to the target samples. For example, surface coatings can reduce any potentially adverse reactions between the substrate material and the particles. Copper and chromium, which are examples of electrode materials, can be toxic to cells. In such cases, a coating on top of the electrodes can reduce leaching of the electrode material into the solution, thereby reducing any toxic interaction between the electrode material and the particles. In some embodiments, surface coatings can be selected to provide good surface wetting properties that, for example, help to reduce bubble formation by making the surface hydrophilic. Alternatively, or additionally, surface coatings can be selected to create a surface charge (e.g., a negative surface charge) to reduce surface adhesion of cells. In addition to their functional property or properties, coatings can be thin (e.g., less than about 50 microns thick), uniform, stable, inert, sterilisable, durable and/or have good adhesion to the electrode and substrate materials.

In embodiments where the electrode and/or substrate surfaces are coated with substances known to enhance or reduce cell adhesion, the coating can improve selective trapping of certain particle types, or to quantify particle adhesion effects. For example, certain types of fibroblasts adhere well to surfaces coated with the glycoprotein known as fibronectin, but not to surfaces coated with cytotactin. Likewise, B-lymphocytes and T-lymphocytes are known to have significantly different adhesion tendencies to different types of glycoprotein surfaces. Known cell adhesive substances that can be used as a coating include proteins such as fibronectin or laminin, antibodies or fragments of antibodies, peptides or peptides conjugated to an inert protein such as serum albumin.

Although surface coatings are often horogenous, in some embodiments, different portions of the electrode and/or substrate surface can be coated with different materials. For example, opposing electrodes (or electrode arrays) can be coated with different materials. One example of this is where opposing electrode arrays are coated with materials providing different degrees of adhesion to particles.

Figure 5A:
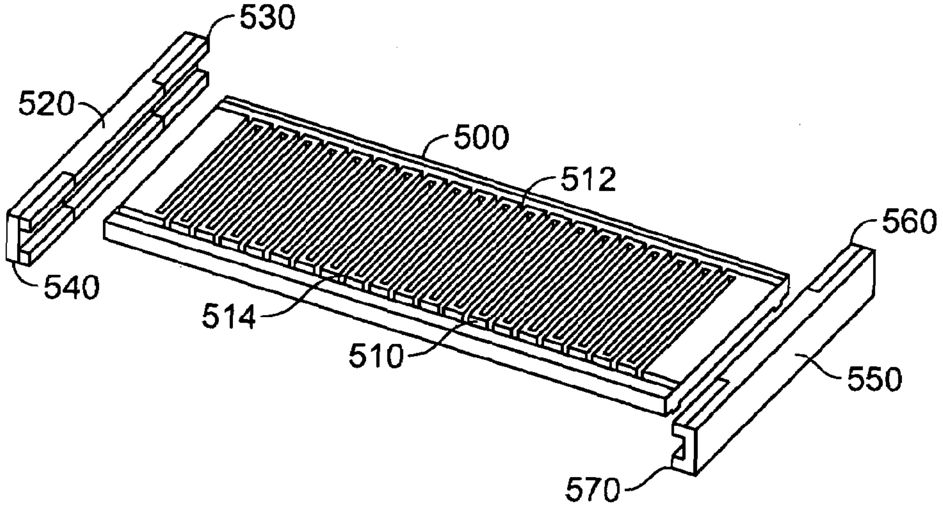
FIGS. 5A and 5B are diagrams illustrating steps in the construction of a coiled electrode element for a DEP filter.
Figure 5B:
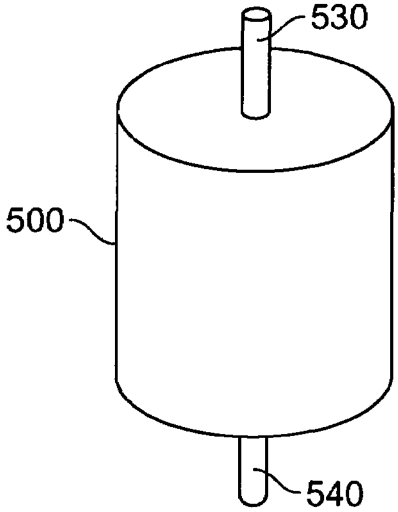

Referring to FIG. 5A and FIG. 5B, in some embodiments, the electrode element is prepared by first forming a layer of the electrode material on a flexible planar substrate (e.g., a polymer substrate). The electrode material layer is sufficiently thick to provide desired conductivity, while retaining sufficient mechanical flexibility to be rolled into a coil. Using photolithographic techniques, portions of the electrode material layer are etched away to form interdigitated electrodes 510. The substrate is then rolled around a shaft 520. Shaft 520 includes conducting portions 530 and 540. Once the substrate is coiled, conducting portions 530 and 540 maintain electrical contact to bus lines 512 and 514, respectively. Shaft 520 is longer than the width of substrate 500 so that conducting portions 530 and 540 extend out of the coiled substrate, providing electrical contact points to a cartridge to which cable 145 (see FIG. 1) can be connected.

In some embodiments, the outer edge of coiled substrate 500 can be connected to a second shaft 550 that includes conducting portions 560 and 570 which make electrical contact between bus lines 512 and 514 and the external electrical contacts of substrate 500. The second shaft reduces any potential drop along the bus lines and helps to maintain the electrical connection of the signal generator to the substrate. Additional electrical connections between the bus lines and the signal generator can be provided, either by additional similar shafts or through wire connections.

In some embodiments, the substrate can be heated during coiling. Depending on the substrate material, a heated substrate may be more flexible than the substrate at room temperature. Once the heated substrate has been coiled, it can be cooled to a temperature at which the substrate material is more rigid. Examples of materials that may be heated during coiling include glassy materials, such as glassy polymers.

Electrode arrays can be disposed on both sides of the substrate. Where the substrate is sufficiently tightly coiled (i.e., the space between surfaces of adjacent layers), the electrode geometry can be selected to optimize the interaction between electrodes on opposite surfaces.

One performance parameter of system 100 is the rate at which it can process samples. This rate depends on, for example, the sample size, filter volume, and volumetric flow rate through the filter. For a given cross-sectional area of a filter chamber, the maximum volumetric flow rate is determined, at least in part, by the maximum fluid velocity that can be achieved with regard to the DEP forces, the hydrodynamic fluid forces, and shear stress on the cells. Typically, the flow rate should be sufficiently slow to maintain laminar flow conditions, and should not negatively impact DEP forces (e.g., should not dominate DEP forces on target particles). Flow velocities can be on the order of 0.001 mm/s to ten mm/s (e.g., 0.01 mm/s, 0.05 mm/s, 0.1 mm/s, one mm/s). Design requirements for the filter can be found by determining a practical processing time for samples that will provide a desired level of purity and degree of recovery of target particles from the sample.

In many embodiments, fluid flow shear stress should be sufficiently small so that the stress does not damage particles in the fluid. The threshold for particle damage depends on the particle type. For example, red blood cells can be damaged at shear stresses of 150 $N/m^2$ or more, while lymphocytes can be damaged at shear stresses 20 $N/m^2$. In some embodiments, fluid flow shear stress in the filter is less than about 10 $N/m^2$, such as less than about 1 $N/m^2$.

In some embodiments, the conductivity of the suspending fluid can be adjusted to change the DEP force experienced by a particle type. For example, the fluid conductivity can be adjusted over many decades of magnitude (e.g., 0.1–1000 mS/m). The conductivity of the suspending media can be altered by flowing a medium through the filter from the supply reservoir 120 that has a higher or lower conductivity than that of the original suspending media. In some embodiments, this can be achieved by filling the sample reservoir 120 with fluid from the buffer reservoir 170, resulting in the fluid being filtered having a time-varying conductivity.

Typically, with increasing conductivity of the sample, a positive DEP force acting on a cell becomes weaker for any fixed AC voltage. Thus, an introduction of a fluid having higher conductivity at the inlet port will result in a time-varying conductivity of the fluid in the filter, which can result in differential releasing of target particles from the filter allowing fractionation to be achieved. In addition, increased fluid conductivity often increases constraints related to power dissipation and heat generation can be placed on the maximum voltage that can be applied to the electrodes. Therefore, in many embodiments, samples of low conductivity can be pumped through the filter at higher fluid velocities compared to similar samples of high conductivity. The concept of a time-varying conductivity, also referred to as a "conductivity gradient," is described by G. H. Markx, P. A. Dyda, and R. Pethig, in "Dielectrophoretic Separation of Bacteria using a Conductivity Gradient," *J. Biotechnology* 51, pp. 175–180 (1996), the contents of which are hereby incorporated by reference in their entirety.

Although the foregoing description refers to creating a time-varying conductivity in the sample, the disclosed methods can be used to enhance fractionation purity and recovery of target particles for each, or any combination of, buffer medium by changing conductivity, permittivity, pH, osmolarity and/or temperature. Furthermore, while in system 100 buffer reservoir 170 is configured to supply a buffer medium to filter 110 through supply reservoir 120, alternatively, buffer reservoir can be configured to supply the buffer medium to other components of the system. For example, buffer reservoir 170 can supply the buffer medium directly to filter 110, or to filter 110 through pre-filter 160, or through one or more of the tubes connecting system components. In some embodiments, system 100 includes a valve to control flow of the buffer medium from buffer reservoir 170.

Figure 6A:
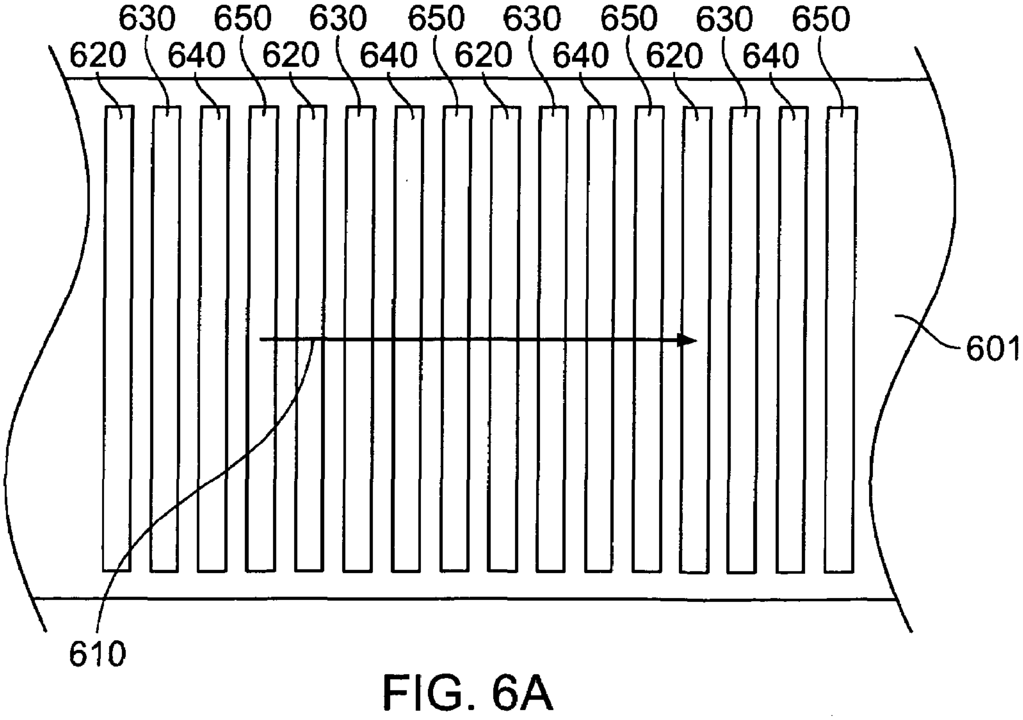
FIGS. 6A and 6B are schematic diagrams of electrode arrays for traveling wave DEP.

In some embodiments, the electrodes and signal generator are configured to provide a traveling wave electric field. Referring to FIG. 6A, an electric field traveling in the direction of arrow 610 is generated by addressing adjacent electrodes with sinusoidal voltages of 90 degree phase separation. In FIG. 6A, electrodes labeled 620, 630, 640, and 650 disposed on a substrate 601 have a relative phase of zero degrees, 90 degrees, 180 degrees, and 270 degrees, respectively. The phase quadrature voltages are each of equal amplitude (typically between 1 V to 5 V peak-to-peak), and frequency in the range from about one kHz to 100 MHz.

If the voltage frequency for a particular suspending medium conductivity is in the range where a particle type experiences a positive DEP force, particles will be attracted to and immobilized at the electrodes. If a particle experiences a negative DEP force, it will be repelled from the electrodes. When a particle is forced away from the electrodes under the influence of negative DEP, the time-averaged traveling field force acting on the particle can propel the particle in a direction perpendicular to the electrodes. The speed and direction of this movement are determined by the physicochemical properties of the particles, the applied field magnitude and frequency, and the dielectric properties of the suspending medium.

Depending on the direction of the induced force exerted on the particles, traveling field DEP can be used to move a target particle type towards the inner layers or outer layers of the coiled substrate. In some embodiments, the inlet and outlet ports can be adapted to preferentially introduce or extract fluid from inner or outer layers of the coiled substrate, depending on which direction the traveling field DEP moves the particles. For example, fluid can be introduced through inlet ports corresponding to the outer layers of the coiled substrate. Traveling field DEP can be used to move target particles toward the inner layers of the coiled substrate. Accordingly, fluid extracted from the inner layers should have significantly higher concentrations of the target particle than fluid extracted from the outer layers. The outlet manifold can be configured to direct fluid extracted from the inner layers to a first reservoir, and direct fluid extracted from outer layers to a different reservoir.

Figure 6B:
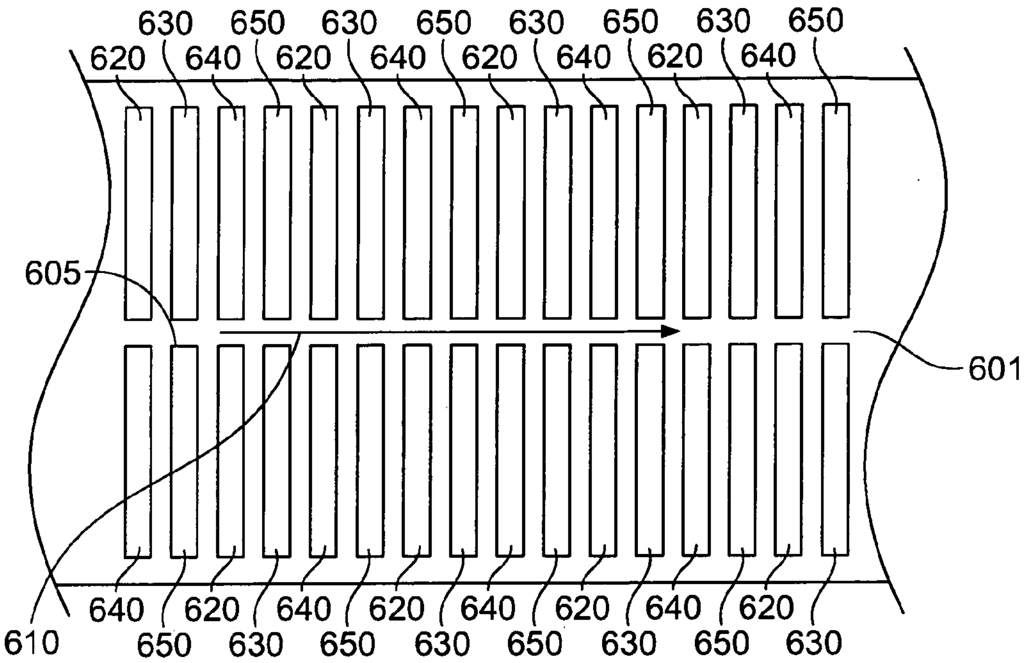

Referring to FIG. 6B, electrodes can also be arranged to have a channel 605 running non-parallel (e.g., perpendicular) to their length. When the electrodes are stimulated with a quadrature phase signal where electrodes on opposite sides of channel 605 are 180 degrees out of phase with respect to each other, suspended particles can be forced to move in channel 605 between the electrodes. Although FIG. 6(*b*)

shows the electrodes on opposing sides of channel 605 registered with each other, the electrodes can also be staggered.

Figure 7A:
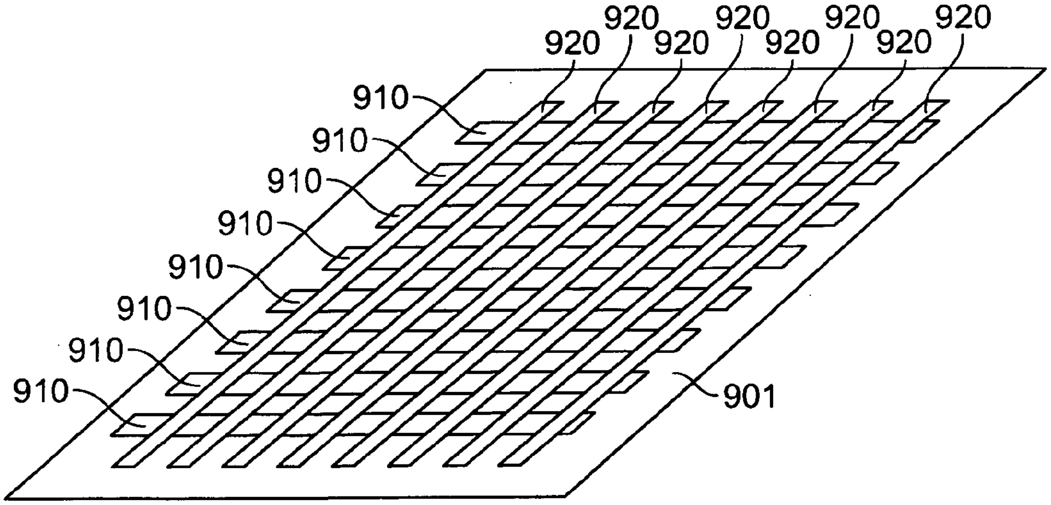
FIGS. 7A and 7B are schematic diagrams showing overlapping electrodes.
Figure 7B:
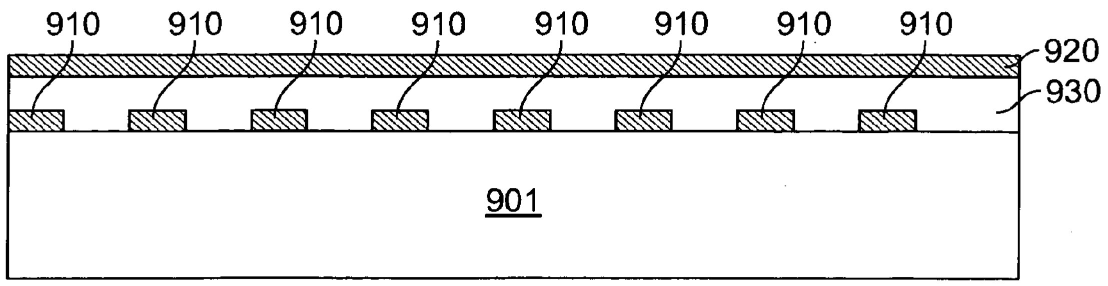

Referring to FIGS. 7A and 7B, in some embodiments the system can include overlapping electrode arrays. Overlapping electrode arrays refer to arrays that are disposed over the same area of a substrate, but are electricaliy isolated from each other. FIG. 7A shows a perspective view of electrode arrays 910 and 920 that are disposed over the same area of substrate 901. Electrode arrays 910 and 920 are separated by an insulating layer 930.

In operation, by applying appropriate traveling wave signals to each array, the system can apply a dielectrophoretic force in two non-parallel directions. In the present embodiment, for example, where the electrodes arrays are of interdigitated electrodes and are oriented orthogonally to each other, the particles can experience two dielectrophoretic force vectors parallel to the plane of the substrate wherein the force vectors are perpendicular to each other. More generally, the electrode arrays can be oriented to apply forces at non-perpendicular angles.

Using overlapping electrodes, the system can shepherd particles to specific locations of the substrate, e.g., adjacent particular outlet channels in the chamber.

In some embodiments, additional electrode arrays are included on a substrate surface close to the filter's outlet manifold. Trapped target particles can be released by the primary electrode arrays and re-trapped on the additional electrode arrays close to the outlet. These particles can subsequently be flushed from the filter without having to flush the entire filter. Flushing the target particles from the filter in a reduced volume of fluid increases the particle concentration.

Figure 8A:
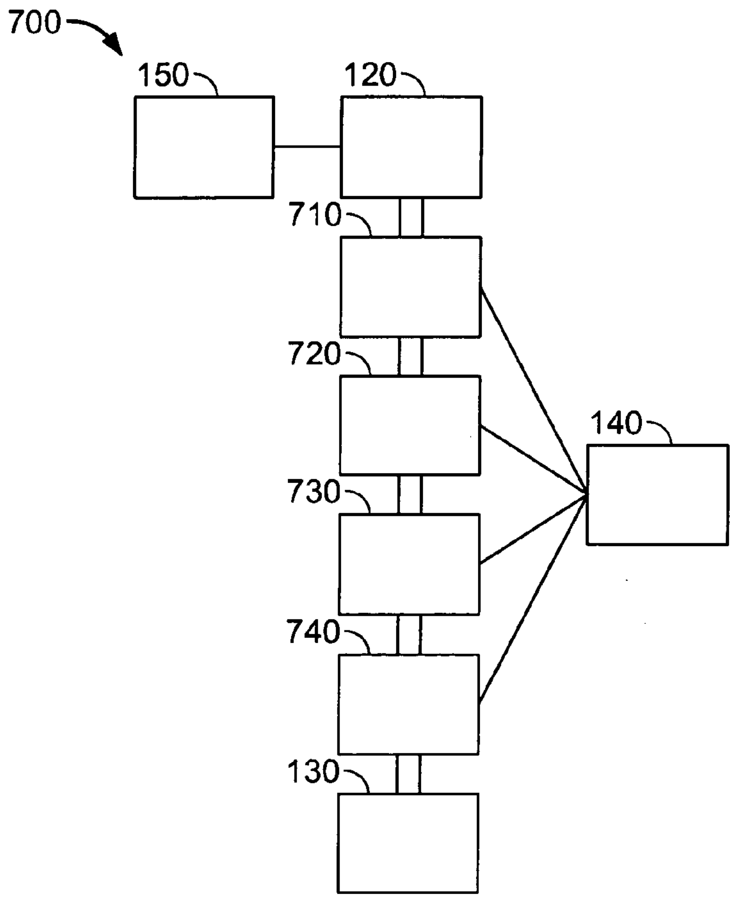
FIGS. 8A and 8B are schematic diagrams of DEP filtration systems including multiple filters.

DEP filtration systems can include more than one filter. For example, filtration systems can include multiple filters connected in series, which can improve the purity of the filtered fluid. Referring to FIG. 8A, a filtration system 700 includes four filters connected in series. Pump 150 pumps fluid from supply reservoir 120 to a first filter 710, where it is initially filtered. Fluid exiting filter 710 enters a second filter 720 where it is filtered a second time. Similarly, the fluid is filtered through filters 730 and 740 before being supplied to collection reservoir 130. The particle types filtered by each filter in the series can be the same or different.

Filters connected in series can have the same or different volumes. In some embodiments, fluid can flow from a larger to a smaller filter. In such configurations, and where both filters trap the same target particle type, target particle concentrations in the fluid can be increased by releasing target particles trapped in the first, larger filter and retrapping them in the smaller filter. Flushing the smaller filter then yields a fluid having higher concentration of target particles than the original fluid.

Figure 8B:
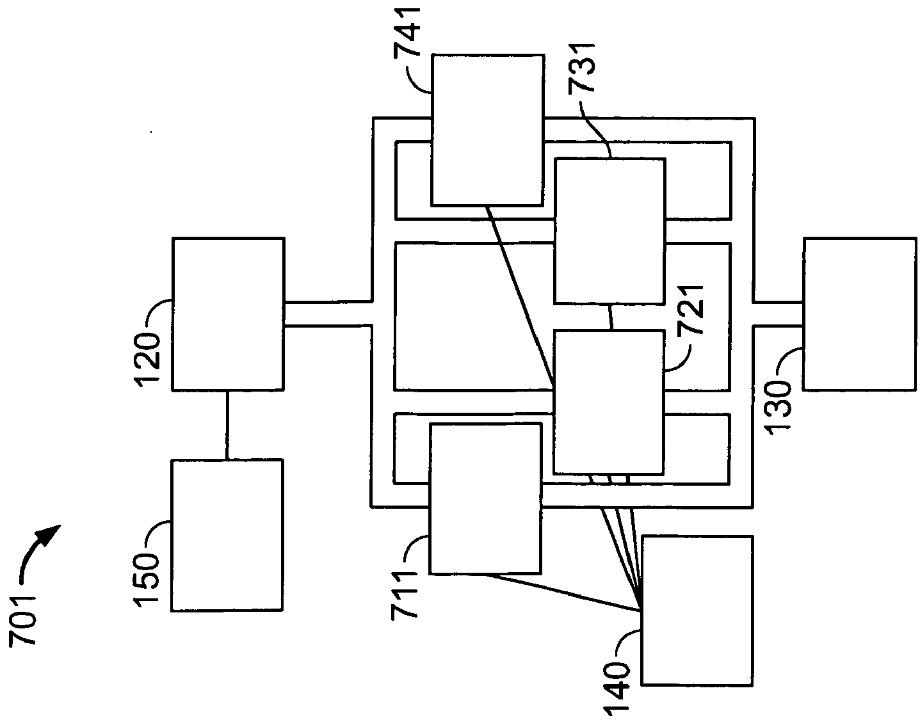

Alternatively, or additionally, multiple filters can be connected to the supply reservoir in parallel. Referring to FIG. 8B, in an exemplary embodiment, a DEP filtration system 710 includes four filters 711, 721, 731, and 741 connected to supply reservoir 120 in parallel. Pump 150 pumps a sample of the fluid from the supply reservoir through one of the filters, and into collection reservoir 130. Parallel filters can improve the throughput of a filtration system.

Figure 9:
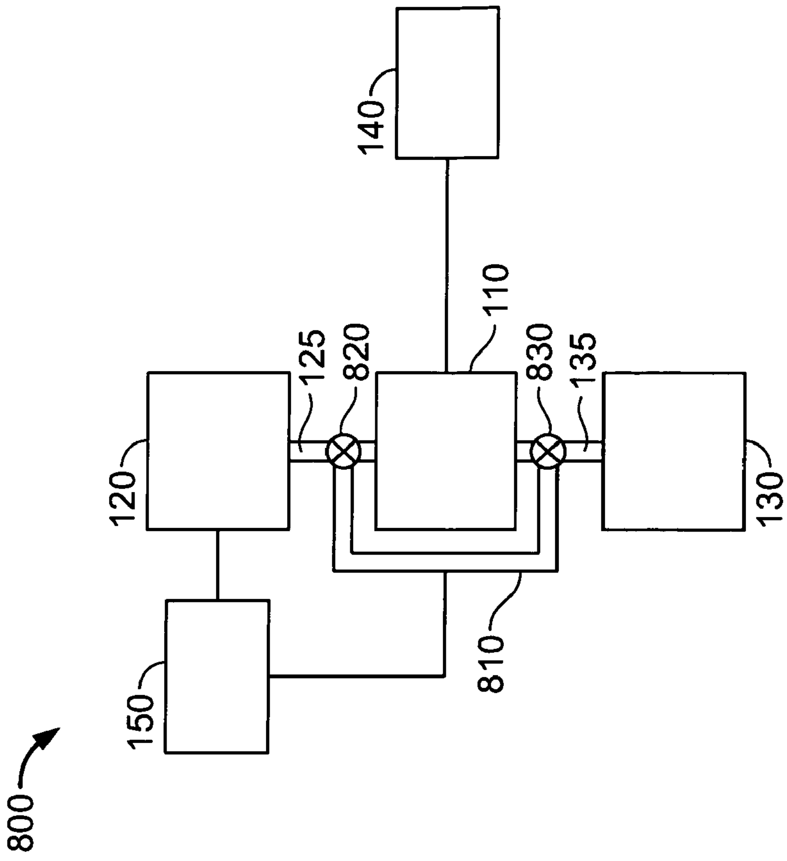
FIG. 9 is a schematic diagram of a DEP filtration system including a recirculating tube.

In some embodiments, filtered fluid can be passed through a filter multiple times in order to improve the purity of the separation. For example, referring to FIG. 9, a DEP filtration system 800 includes a recirculating tube 810, which is coupled to inlet tube 125 with valve 820 and to outlet tube 135 with valve 830. With valve 830 in a first position, filtered fluid exiting filter 110 flows through recirculating tube 810 back to the inlet of filter 110 through valve 820, an is filtered again by filter 110. With valve 830 in this position, the fluid can be passed through filter 110 multiple times, the filtered fluid becoming more refined with each pass. Once the fluid is sufficiently refined, valve 830 can be switched to another position that allows the filtered fluid to flow through outlet tube 135 into collection reservoir 130. In the present embodiment, pump 150 can be configured to pump fluid recirculating through tube 810.

In general, DEP filtration system 100 can be adapted to remove many types of dielectric particle from fluid media. For example, filtration systems can be used to separate one or more different types of cells from blood (e.g., the target particle can be blood born bacteria, viruses, or white or red blood cells). Other examples include removing various pathogens (e.g., biological agents such as anthrax) from a fluid sample. DEP filtration systems can be used to increase the concentration of one or more target particles in a fluid sample (e.g., for producing samples for Polymerase Chain Reaction (PCR) assays, where sample relative concentration should be about 1:1,000,000 or higher).

More generally, the particles may include other types of biological particles. For example, particles can include cells, or components of cells and/or microorganisms. Examples of components of cells include proteins and DNA. Examples of microorganism's include bacteria. Examples of biological particles also include pathogens, such as viruses.

Particles can be polymeric. For example, the particles may include polymer microspheres (e.g., polystyrene microspheres).

Particles can be solid, semi-solid, liquid or gaseous. Examples of solid particles include aforementioned polymer spheres or protein macromolecules. Examples of semi-solid particles include poly-acrylamide or agar gel particles. Examples of liquid particles include the dispersed phase in an emulsion, such as oil droplets in water or liquid particles in an aerosol, and examples of gaseous particles include the dispersed phase in a foam, such as gas bubbles in a liquid.

In some embodiments particles can be tagged with an antibody-coated moiety, such as a gold label or a polymeric bead, whose presence on the surface of the target particle changes the intrinsic dielectric properties of the particle and improves the purity and recovery of the separation process. Particles can be tagged for use with fluorescent microscopy techniques, or tagged with a magnetic moiety for separations that combine dielectrophoretic forces with magnetic ones.

Particle size may vary. Particles are generally sufficiently small to pass between the gap between surfaces of adjacent layers of the coiled substrate. In some embodiments, particles are large enough to be observed using optical microscopy (e.g., larger than about 0.5 microns in diameter, such as 1 micron or larger). In some embodiments, particles can be larger than about 1 millimeter in diameter.

Dielectrophoretic filters, such as those described above, can be used in numerous applications. For example, dielectrophoretic filters can be used for drug discovery. Typically, in drug discovery applications, the dielectrophoretic response of a cell population is studied in response to various compounds. A change in a cell's DEP response may reflect a favorable or unfavorable reaction to a compound.

A parameter that can be used to characterize a DEP response of a cell or other bioparticle is the DEP 'cross-over' frequency. If the electrodes are energized at a frequency lower than this 'cross-over' frequency, a cell will experience a negative DEP force that repels it from the electrodes. At a frequency higher than the 'cross-over' frequency, the cell will experience a positive DEP force that will attract it to the electrodes. According to Pethig and coworkers, the 'cross-over' frequency for T lymphocyte cells is altered when they are exposed to chemicals that induce a so-called 'activation' of these T cells and a change in cell cycle status (see, Electrophoresis, volume 23, pages 2057–2063 (2002)). This change in DEP response can alter the way that these cells are collected or eluted from a DEP filter as a function of the frequency of the electrical signals applied to the electrodes. Thus, a DEP filter may be used to screen how T cells respond to various compounds that may initiate cell activation or changes in the cell cycle population kinetics of a suspension of cells. In some embodiments, a DEP filter may also be used to detect and quantify the chemical inducement of apoptosis (see, e.g., Pethig's article in Electrochemistry, volume 71, pages 203–205 (2003))

Another application example is in diagnostics. In diagnostic applications, a DEP filter can be used to increase the concentration of a particle population. For example, where one is investigating a type of bacteria in blood, one can use DEP to increase the concentration of the bacteria to a level suitable for subsequent investigation methods. To do this, one can use a relatively small volume DEP filter to trap the bacteria while filtering a large volume sample of blood. The fluid retained in the filter will have an increased concentration of the bacteria compared to the original blood sample. Purging the filter then provides a sample for diagnostic work. An example of how positive DEP can be used to attract the bacteria *M. luteus* to an electrode array, whilst repelling blood cells from the same electrode array, has been described by Wang and coworkers in the Journal of Applied Physics D, volume 26, pages 1278–1285 (1993). Cheng and coworkers have described essentially the same effect for the case of *E. coli* mixed with blood cells in Nature Biotechnology, volume 70, pages 2321–2326 (1998).

A further application example is in cell therapy. In cell therapy, a DEP filter can be used to separate different types of cells from other cells in a sample. An example of this is separating stem cells from a sample including a mixture of stem cells and other cells. The DEP filter can be operated under conditions at which stem cells are trapped in the filter while the rest of the sample is passed. Subsequent purge of the filter provides a high purity sample of the stem cells. An example of using DEP to separate and enrich stem cell subpopulations from peripheral blood has been described by Stephens and coworkers in Bone Marrow Transplantation, volume 18, pages 777–782 (1996).

Biothreat assessment is another application for DEP filters. Often, in practical situations, a toxin, such as biological agents (e.g., anthrax or smallpox), is present in extremely small concentrations (e.g., about one part per 10 million or less), making them difficult to detect using conventional detection techniques such as polymerase chain reaction (PCR) technology. Even at such low concentrations, these toxins can be lethal. A sample can be screened for such toxins by passing the sample through a DEP filter operating under conditions at which the toxin is trapped in the filter. By filtering a larger sample volume than the volume of the filter, the filter can provide sufficiently concentrated sample for further assessment. The examples cited above, where DEP filters have been used to attract bacteria or yeast cells to an electrode array, whilst repelling blood cells from the same electrode array, may be relevant to biothreat applications.

A number of embodiments of the invention have been described. Nevertheless, it will be understood that various modifications may be made without departing from the spirit and scope of the invention. For example, filtration systems described above may include additional components for controlling additional system parameters. One such component is a temperature controller. Several important system parameters, such as fluid viscosity and/or dielectric properties of the fluid and/or particles are usually dependant on temperature. Thus, it may be beneficial to include components to control the system's temperature. Accordingly, other embodiments and applications are within the scope of the following claims.

What is claimed is:

1. An apparatus comprising:

a substrate coiled around an axis, the coiled substrate comprising a plurality of adjacent substrate layers separated by at least 5 microns, the adjacent substrate layers being separated by a distance that varies depending on a distance of the layers from the axis; and first and second electrodes disposed on a first surface of the substrate, wherein the apparatus is capable of maintaining a potential difference between the first and second electrodes.

2. The apparatus of claim 1, further comprising an inlet manifold through which fluid can be supplied to the coiled substrate.

3. The apparatus of claim 2, further comprising an outlet manifold through which fluid can be removed from the coiled substrate.

4. The apparatus of claim 3, wherein the inlet and outlet manifolds are located at different positions along the axis.

5. The apparatus of claim 2, wherein the inlet manifold comprises a plurality of inlet channels.

6. The apparatus of claim 3, wherein the outlet manifold comprises a plurality of outlet channels.

7. The apparatus of claim 1, wherein the first electrode is an electrode in a first electrode array and the second electrode is an electrode in a second electrode array, and the first and second electrode arrays are disposed on the first surface.

8. The apparatus of claim 7, wherein the first and second electrode arrays comprise interdigitated electrodes.

9. The apparatus of claim 1, wherein the adjacent substrate layers are separated by a distance different from a minimum separation of electrodes in the first and second electrodes.

10. The apparatus of claim 1, wherein the adjacent substrate layers are separated by at least 100 microns.

11. The apparatus of claim 1, further comprising a chamber housing the coiled substrate.

12. The apparatus of claim 1, further comprising a first substrate guide that includes a spiral channel into which a first end of the coiled substrate is slotted.

13. The apparatus of claim 12, further comprising a second substrate guide that includes a spiral channel into which a second end of the coiled substrate is slotted, wherein the first end is opposite the second end.

14. The apparatus of claim 1, wherein the substrate is a polymer substrate.

15. The apparatus of claim 1, further comprising one or more additional electrodes disposed on a second surface of the substrate, the second surface being opposite the first surface.

16. The apparatus of claim 1, wherein the substrate comprises a plurality of perforations.

17. The apparatus of claim 1, wherein the electrodes comprise an electrode material and the apparatus further comprises a layer of a first material disposed on the first electrode, wherein the first material is different from the electrode material.

18. The apparatus of claim 17, wherein the first material is an electrically insulating material.

19. The apparatus of claim 18, further comprising an additional electrode disposed on the surface of the layer.

20. The apparatus of claim 17, wherein the layer reduces a chemical reaction between the electrode material and a particle proximate to the coiled substrate.

21. The apparatus of claim 17, wherein adhesion between a target particle and the first material is different from the adhesion between the target particle and the electrode material.

22. The apparatus of claim 17, further comprising a layer of a second material disposed on the second electrode, wherein the second material is different from the first material.

23. The apparatus of claim 22, wherein adhesion between a cell and the first material is different from adhesion between the cell and the second material.

24. A system for filtering fluid comprising the apparatus of claim 1 and a supply reservoir, wherein the supply reservoir is configured to supply fluid to the apparatus.

25. The system of claim 24, further comprising a buffer reservoir configured to supply fluid to the apparatus.

26. The system of claim 24, further comprising a pre-filter configured to filter fluid from the reservoir prior to the fluid being supplied to the apparatus.

27. The system of claim 26, wherein the pre-filter substantially prevents certain particles in the fluid from entering the apparatus.

28. The system of claim 27, wherein the certain particles are larger than a threshold particle size.

29. The system of claim 28, wherein the threshold particle size has a maximum dimension substantially equal to a minimum separation of adjacent layers of the coiled substrate.

30. The system of claim 24, further comprising a transducer configured to introduce a density variation in the fluid prior to the fluid entering the apparatus.

31. The system of claim 30, wherein the density variation is sufficient to separate particles in the fluid from each other prior to the particles entering the apparatus.

32. An apparatus comprising:

a substrate coiled around an axis;

first and second electrodes disposed on a first surface of the substrate;

an inlet manifold through which fluid can be supplied to the coiled substrate; and an outlet manifold through which fluid can be removed from the coiled substrate, wherein the inlet and outlet manifolds are located at different positions along the axis and the apparatus is capable of maintaining a potential difference between the first and second electrodes.

33. An apparatus comprising:

a substrate coiled around an axis;

first and second electrodes disposed on a first surface of the substrate; and a first substrate guide that includes a spiral channel into which a first end of the coiled substrate is slotted, wherein the apparatus is capable of maintaining a potential difference between the first and second electrodes.

34. The apparatus of claim 33, further comprising a second substrate guide that includes a spiral channel into which a second end of the coiled substrate is slotted, wherein the first end is opposite the second end.

35. An apparatus comprising:

a substrate coiled around an axis, the substrate comprising a plurality of perforations; and first and second electrodes disposed on a first surface of the substrate, wherein the apparatus is capable of maintaining a potential difference between the first and second electrodes.

36. An apparatus comprising:

a substrate coiled around an axis;

first and second electrodes disposed on a first surface of the substrate, the electrodes comprising an electrode material and the apparatus further comprising a layer of a first material disposed on the first electrode, the first material being different from the electrode material;

wherein the apparatus is capable of maintaining a potential difference between the first and second electrodes.

37. The apparatus of claim 36, wherein adhesion between a cell and the first material is different from adhesion between the cell and the second material.

* * * * *